(12) United States Patent
Guess et al.

(10) Patent No.: US 6,375,834 B1
(45) Date of Patent: Apr. 23, 2002

(54) WATER FILTER MONITORING AND INDICATING SYSTEM

(75) Inventors: Ronald W. Guess, Evansville, IN (US); Dale A. Beard, Dayton, OH (US); Patrick J. Gotzbach, St. Joseph, MI (US); Keith A. Snyder, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 09/605,776

(22) Filed: Jun. 28, 2000

Related U.S. Application Data

(60) Provisional application No. 60/141,693, filed on Jun. 30, 1999.

(51) Int. Cl.[7] .......................... B01D 35/143; F25D 3/02
(52) U.S. Cl. ........................ 210/85; 210/94; 210/87; 210/138; 210/175; 222/32; 222/189.06; 340/607; 62/318
(58) Field of Search .............................. 210/85, 94, 87, 210/138, 175; 222/23, 189.06, 189.11, 32; 340/607; 137/551, 554; 62/389, 338, 339, 318; 700/271

(56) References Cited

U.S. PATENT DOCUMENTS

| | | | |
|---|---|---|---|
| 3,982,406 A | | 9/1976 | Hanson et al. |
| 5,135,645 A | | 8/1992 | Sklenak et al. |
| 5,676,824 A | * | 10/1997 | Jeon et al. |
| 5,707,518 A | | 1/1998 | Coates et al. |
| 5,715,699 A | | 2/1998 | Coates et al. |
| 5,813,245 A | | 9/1998 | Coates et al. |
| 5,858,215 A | * | 1/1999 | Burchard et al. |
| 5,865,991 A | * | 2/1999 | Hsu |
| 5,907,958 A | | 6/1999 | Coates et al. |
| 6,149,801 A | * | 11/2000 | Giordano et al. |
| 6,214,239 B1 | * | 4/2001 | Renau |

* cited by examiner

*Primary Examiner*—Joseph W. Drodge
*Assistant Examiner*—Terry K Cecil
(74) *Attorney, Agent, or Firm*—Stephen Krefman; Robert O. Rice; Joel M. Van Winkle

(57) ABSTRACT

A low cost method and apparatus for indicating when to replace a water filter in a water and ice delivery system for a refrigerator. The invention uses a low cost microprocessor and senses the operational condition of an ice maker water valve, a water dispenser valve to monitor and track water usage. The microprocessor has a built-in memory to retain water usage and other data during a power outage, The invention also senses the status of a door switch to permit user input of a reset message indicating that the filter has been changed as well as an input indicating a different type of filter has been installed. The microprocessor controls a tri-color light emitting diode to display the status of the filter as "good", "order" or "change" which is determined based on the selection of the type of filter system, the amount of time since the last filter change, and the amount of water usage since the last filter change.

17 Claims, 9 Drawing Sheets

Table I

| REFERENCE | TYPE | DESCRIPTION |
| --- | --- | --- |
| 74 | Resistor | Film 47 2W 5% Axial, Dale CW 2B |
| 76 | Capacitor | Neft. 0.68U 250V 20% Radial |
| 78 | Capacitor | Cer. 0.1U 50V 20% Radial |
| 80 | Capacitor | ELYT 470U 16V 20% |
| 86 | Diode | Zener IN5231B 5V D035 |
| 90 | Connector | HDR-RT Lock 4P/2R 9A 0.165 |
| 110 | Diode | LED-G/R 20mA 2V TI3/4-RT |
| 126 | Resistor | Film 6.8 1/4W 5% Axial |
| 128 | Diode | XSTR PNP 2N3906 TO-92 |
| 140 | IC uP | CMOS PIC12CE518-04/P PDIP8 |
| 82, 84 | Diode | Rctf. IN4007 1000V DO41 |
| 122, 124 | Resistor | Film 39K 1/4W 5% Axial |
| 136, 138 | Resistor | Film 300 1/4W 5% Axial |
| 114a, 116a, 118a | Resistor | Film 1M 1/4W 5% Axial |
| 114b, 116b, 118b | Resistor | Film 220K 1/4W 5% Axial |

Fig. 4b

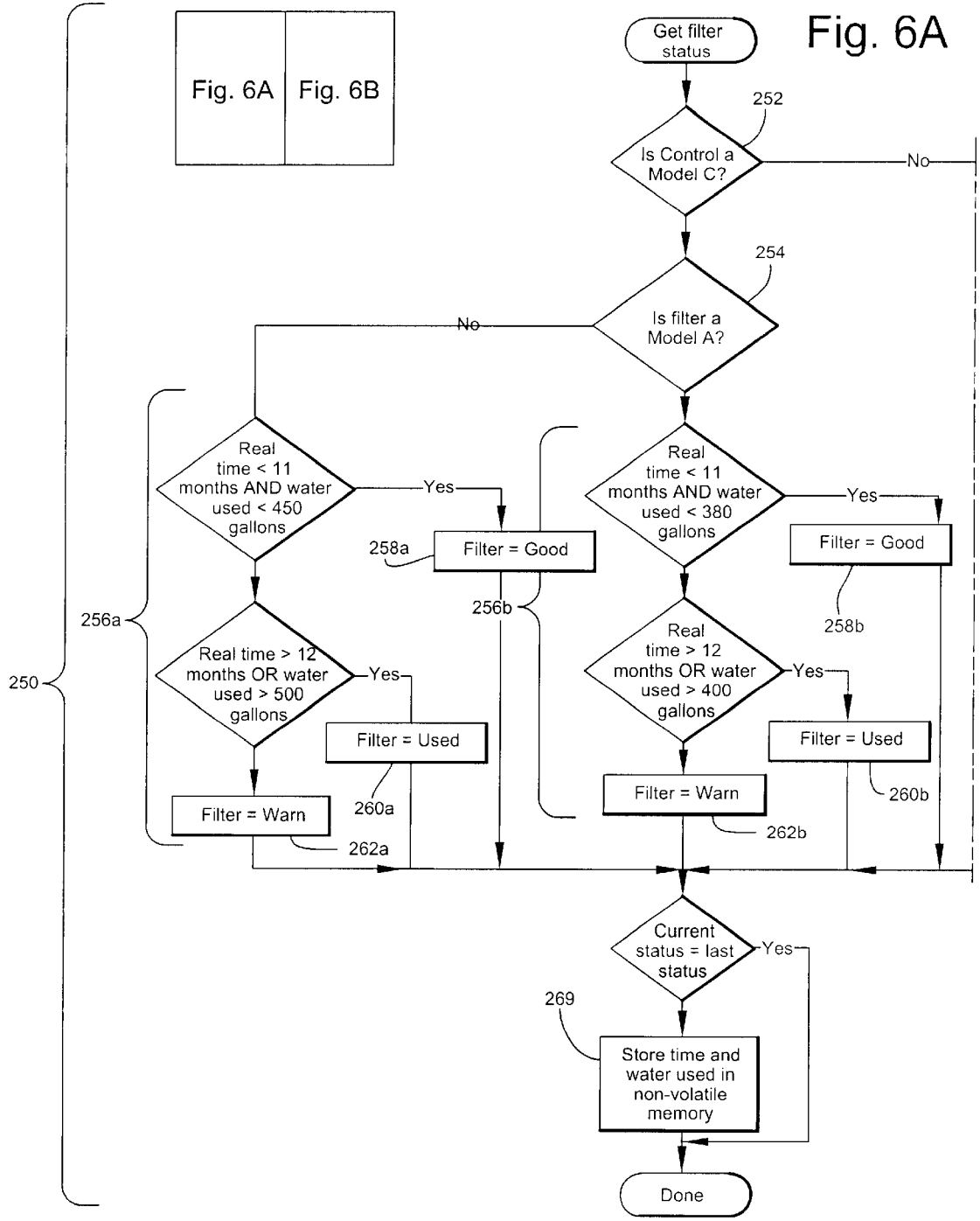

WATER FILTER MONITORING AND INDICATING SYSTEM

This application claims the benefit of U.S. Provisional Application No. 60/141,693, filed Jun. 30, 1999.

BACKGROUND OF THE INVENTION

1. Field of the Invention

The invention relates to a water filtration system for a refrigerator and more particularly to an indicator for notifying a user when to change the filter.

2. Description of the Related Art

Many refrigerators, and especially those using a side-by-side configuration wherein the fresh food compartment is located to one side of the frozen food compartment, include integrated ice and water delivery systems. Typically, such systems deliver water and ice through the door of the frozen food compartment to an ice and water station recessed in the door.

Increasingly such systems incorporate a filtration system with a replaceable filter element or cartridge so as to improve the quality of the ice and water delivered to the user of the refrigerator.

Examples of such systems can be seen in U.S. Pat. No. 5,907,958 issued Jun. 1, 1999 to Coates, et al. and entitled "Refrigerator water filter"; U.S. Pat. No. 5,813,245 issued Sep. 29, 1998 to Coates, et al. and entitled "Pressure relief circuit for refrigerator contained water filter"; U.S. Pat. No. 5,715,699 issued Feb. 10, 1998 to Coates, et al. and entitled "Refrigerator water filter"; U.S. Pat. No. 5,707,518 issued Jan. 13, 1998 to Coates, et al. and entitled "Refrigerator water filter"; U.S. Pat. No. 5,135,645 issued Aug. 4, 1992 to Sklenak, et al. and entitled "Refrigerator water filter"; and U.S. Pat. No. 3,982,406 issued Sep. 28, 1976 to Hanson, et al. and entitled "Refrigerator water storage and dispensing system with water filter".

Since the filters must be periodically replaced to maintain the quality of the water, various methods and apparatus could be used to notify the user of the need to change the filter. However, such many potential approaches would be costly, complex and inflexible as to substitution of different types of filters having different useful lives. Furthermore, in an effort to such reduce cost, many such approaches fail to give the user advance warning that the filter will soon need to be replaced. Additionally, the controls might be used on more than one model of refrigerator in conjunction with more than one type of filtration media.

What is needed, therefore, is a filter monitoring and indicating system that is flexible enough to permit its use with different types of filters. It would be most beneficial if the system doesn't add the cost of requiring an additional switch or sensor for detecting the type of filter being used but instead relies on existing components, where possible.

What is further needed is an inexpensive filter monitoring and indicating system that not only informs the user that a filter needs to be replaced, but provides earlier warning that the filter will need to be replaced soon and therefore a new filter needs to purchased.

SUMMARY OF THE INVENTION

The present invention is directed to a low cost method and apparatus for monitoring the operation of a water and ice delivery system for a refrigerator and indicating when to replace a water filter used in the water and ice delivery system.

The water filter monitoring and indicating method and apparatus of the present invention relies on components existing in many conventional water and ice delivery systems and refrigerators to reduce complexity and number of components. It senses the operational condition of the fresh food compartment door and the valves regulating the water flow into the ice maker and the water dispenser of the refrigerator. The method and apparatus monitors and tracks the duration of valve openings to estimate water consumption since the filter has been changed. Furthermore, it tracks the amount of time that has passed since the last time the filter has been changed. The method and apparatus further tracks user inputs to the fresh food compartment door switch to determine when a filter has been replaced.

The water filter monitoring and indicating method and apparatus of the present invention determines when the filter needs to be changed by comparing the water usage and filter age data with a first set of pre-selected standards for the type of filter being used and further determines when a new filter should be ordered by comparing the water usage and filter age data with a second set of pre-selected standards for the type of filter being used, the second set of pre-selected standards being more stringent than the first set. The method and apparatus then uses a tri-color light emitting diode to display one color when the filter should be replaced, a second color when a filter should be ordered and a third when the filter is good.

In the preferred embodiment of the present invention, the water filter monitoring and indicating system uses a low cost microprocessor to compare the water usage and filter age data with the first and second sets of pre-selected standards, to generate and track a conclusion of a status of "good", "order" (or alternatively, "warn") or "change" (or alternatively, "used") for the filter based on such comparison, and to illuminate the light emitting diode in pre-selected color corresponding to that conclusion of status.

The microprocessor of the water filter monitoring and indicating system of the present invention preferably includes a built-in memory to retain water usage and other data during a power outage.

The light emitting diode of the water filter monitoring and indicating system preferably is illuminated green for a filter status of "good", yellow for a filter status of "order" or "warn" and red for a filter status of "change" or "used".

In the preferred embodiment, the indicator warns the user that the filter will soon be past its rated capacity and therefore that a new filter should be ordered when the filter has reached 90% of its rated age or rated water capacity. This increases the likelihood that a user will have a filter available when one is needed and increased the likelihood that the filter will be replaced in a timely manner. Typical settings for filters may be 400 gallons or 200 gallons capacity and warn at 360 gallons or 180 gallons, respectively.

In the preferred embodiment, the microprocessor further tracks the time that the filter has been installed and compares that with the rated life of the filter, which could be typically between 6 months and 12 months. The user will be warned to replace the filter when it has been installed in the refrigerator for more than 90% of its maximum rated installation life or age. The indicator will therefore illuminate green for a status of "good" if the filter is newer than 90% of its maximum rated age and has been used to deliver less than 90% of its rated capacity and will illuminate red for a status of change if it has exceeded 100% of either limit. Otherwise, it will illuminate yellow, for warn, indicating that it is between 90% and 100% for either age or capacity and will shortly need to be replaced.

The water filter monitoring and indicating system preferably further tracks user inputs to the fresh food compartment door switch to determine what type of filter is being used and utilizes a different first and second set of pre-selected standards for each type of filter selectable by the user. This can be accomplished within the microprocessor by changing the age and or capacity limits or by altering the speed of the internal counter.

The microprocessor is provided with programing to detect a first predetermined rapid sequence of depressions of the door switch as a request by the user to reset the age and usage counters to zero because the filter has been changed. The sequence of pulses is selected to be numerous and rapid enough to be unlikely to be accidentally sent during normal door openings and closings. The microprocessor further interprets a second predetermined sequence of depressions of the door switch as a sign that a different type of filter is being used The light emitting diode of the water filter monitoring and indicating system is preferably located within the fresh food compartment of the refrigerator near the fresh food compartment door switch of the refrigerator to ease use of the indicator and to function aesthetically with the door switch in a control console that can also include the fresh food and frozen food temperature controls. The control console is preferably located on the upper front face of the fresh food compartment so as to minimize access by children.

It is therefore an object of the present invention to provide the consumer with a reliable measure of the filter cartridge end of life condition.

It is a further object of the present invention to provide an inexpensive filter monitoring and indicating system that informs the user that the filter needs to be replaced, by illuminating red and further provides early warning that the filter will need to be replaced soon and therefore a new filter needs to purchased by illuminating yellow.

It is another object of the present invention to provide a filter monitoring and indicating system that is flexible enough to permit its use with different types of filters yet doesn't add the cost of requiring an additional switch or sensor for detecting the type of filter being used by utilizing manual user input to the existing fresh food compartment door switch at a rate which would be unlikely to occur in normal door openings and closings.

These and other advantages of the present invention will become apparent to those skilled in the art when the following detailed description of the preferred embodiment is read in conjunction with the accompanying drawings.

BRIEF DESCRIPTION OF THE DRAWINGS

FIG. 4b is a table indicating specifications of preferred components of the filter control and indicator system of FIG. 4;

DESCRIPTION OF THE PREFERRED EMBODIMENT

The Refrigerator

Figure 1:
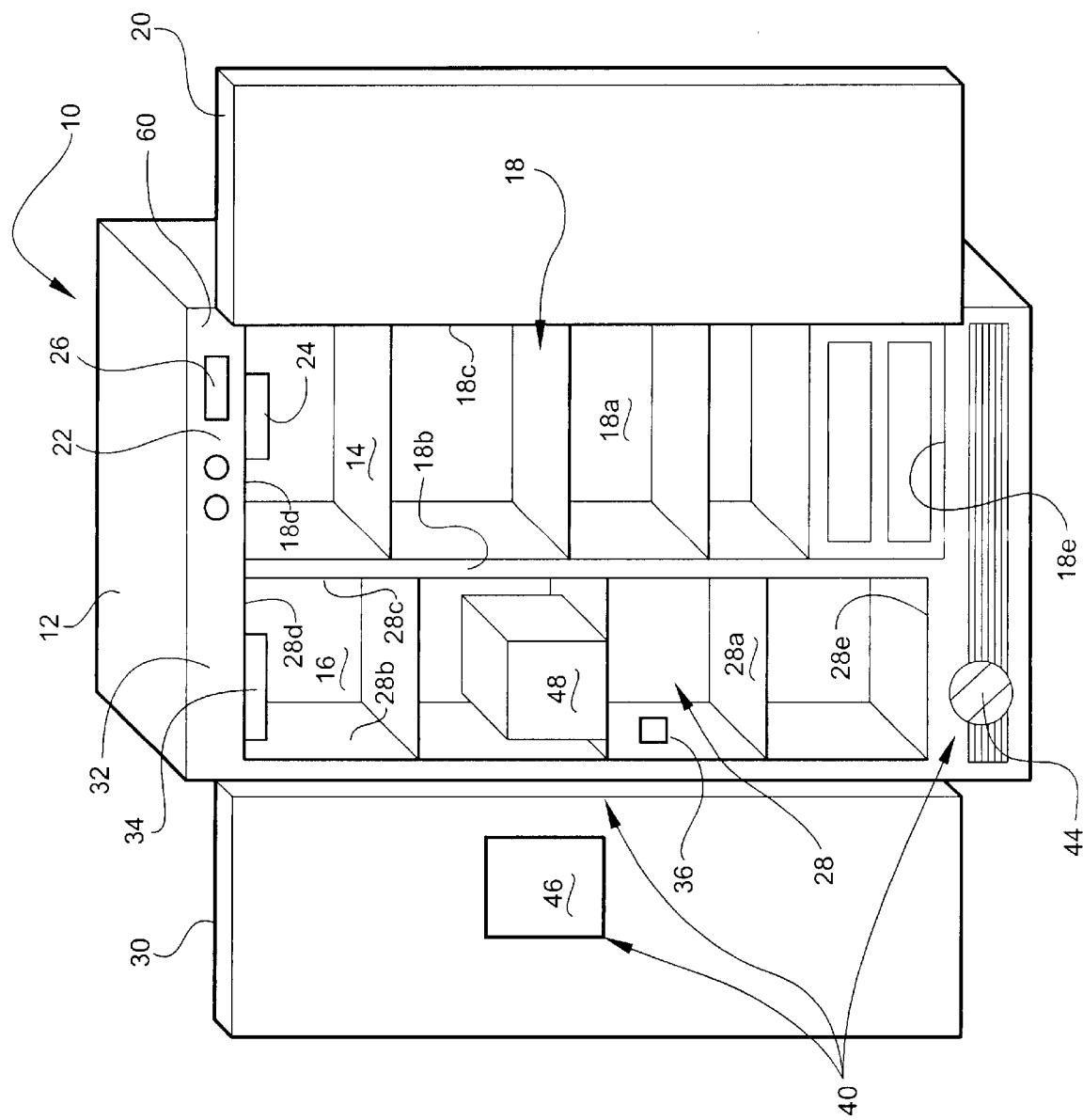
FIG. 1 is a front perspective view of a refrigerator apparatus having a water filtration and filter control and indicator system embodying the present invention.

In the illustrative embodiment of the invention as shown in FIG. 1 a refrigerator 10, comprising a side-by-side fresh food/freezer configuration, is provided having a cabinet 12 forming fresh food compartment 14 and freezer compartment 16.

The fresh food compartment 14 is provided with an access opening 18 and a fresh food door 20 hingedly mounted to the cabinet 12 for selectively closing the access opening 18. The access opening 18 has a back wall 18a, side walls 18b and 18c, top wall 18d, and a bottom wall 18e. The refrigerator 10 also has a partial front wall 22 disposed around the perimeter of the access opening 18 parallel to and selectively engageable with the fresh food door 20 for sealing the access opening 18.

The fresh food compartment 14 is further provided with a light 24 which is connected in series with a light switch 26. The light switch 26 is a reciprocable switch actuated to selectively connect the light 24 with a source of electrical power, not shown, when the door 20 is in an open position and to disconnect the light 24 from the source of electrical power when the fresh food door 20 is in the closed position. In the preferred embodiment, the light switch is located in portion of the partial front wall 22 above the top wall 18d of the access opening.

Similarly, the freezer compartment 16 is provided with an access opening 28 and a freezer door 30 hingedly mounted to the cabinet 12 for selectively closing the access opening 28. The access opening 28 has a back wall 28a, side walls 28b and 28c, top wall 28d, and a bottom wall 28e. The refrigerator 10 also has a partial front wall 32 disposed around the perimeter of the access opening 28 parallel to and selectively engageable with the freezer door 30 for sealing the access opening 28 . The freezer compartment 14 is farther provided with a rocker-type light switch 34 which is connected in series with a light 36 functionally similar to the light 24 and light switch 26 in the fresh food compartment 14.

Figure 2:
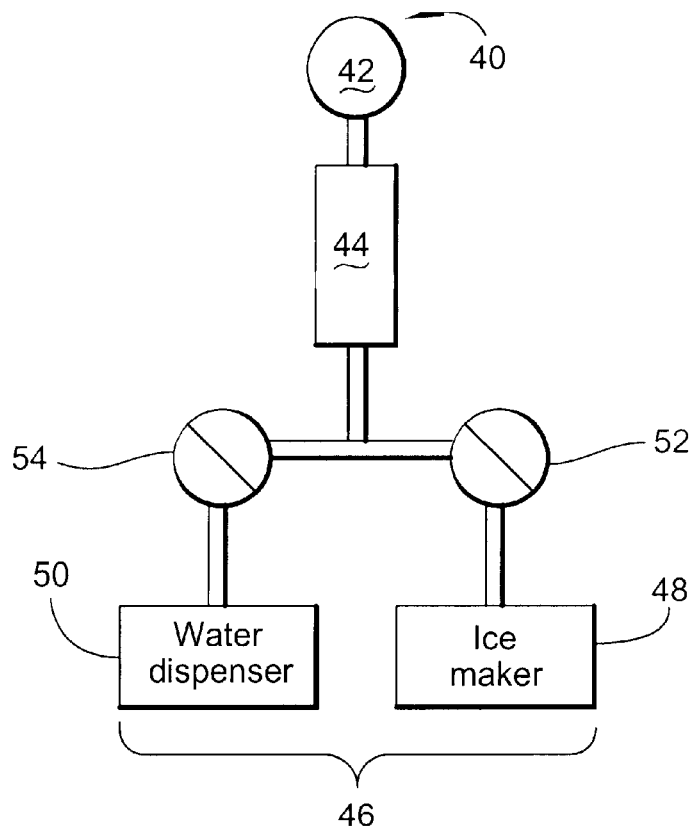
FIG. 2 is a schematic diagram of the ice and water assembly of the refrigerator apparatus of FIG. 1.
Figure 3:
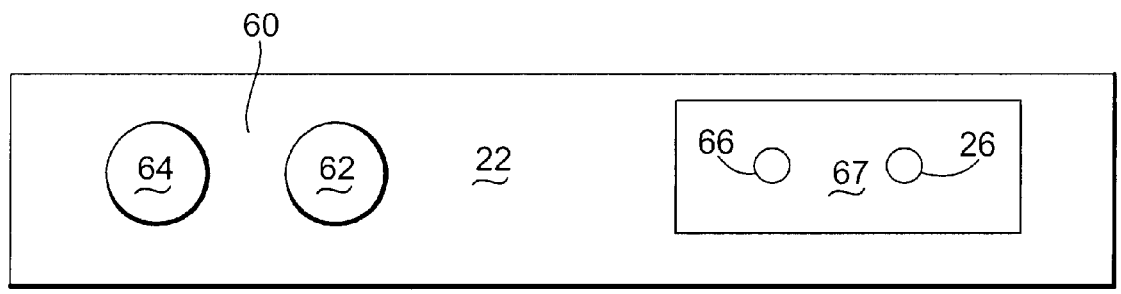
FIG. 3 is a fragmentary enlarged front view of the refrigerator control console of the refrigerator of FIG. 1.

As is farther well known in the art, the refrigerator 10 is provided with a water and ice supply system 40, shown schematically in FIG. 2 for delivering water from an external source 42 through a filter 44 to an ice and water delivery system 46.

The filter 44 may be mounted to the refrigerator below the bottom wall 28e of the access opening 28 and accessed for servicing by selective removal through an opening through the lowermost portion of the partial front wall 32, as shown in FIG. 1. The ice and water delivery system 46 includes an ice making assembly 48 mounted within the freezer compartment 16 and an ice and water dispensing system 46 mounted in the freezer door 30.

The ice making assembly 48 is mounted to the inside surface of the back wall 28a of the freezer compartment 16. The ice and water dispensing system 46 is provided below the ice making assembly 48 for receiving ice pieces therefrom as well as for receiving cool water from a water supply system 40. As shown in FIG. 2, the water and ice supply system 40 includes electrically operable water valves 52 and 54 for supplying water, respectively, to the ice making assembly 48 and the ice and water dispensing system 46.

The ice and water dispensing system 46 includes an ice storage receptacle or bin not shown. When operated, the ice and water dispensing system 46 transfers ice pieces from the ice storage receptacle or bin through the freezer door 30 whereby ice pieces may be dispensed through a conventional, forwardly exposed ice dispenser station or external ice service area not shown.

In the preferred embodiment of the present invention, a refrigerator control console 60 is defined on an upper portion of the partial front wall 22 of the fresh food compartment 16 in the vicinity of the light switch 26. The refrigerator control console 60, which is shown integral with the front wall 22, includes a fresh food compartment temperature control switch 62, a freezer compartment temperature control switch 64, the light switch 26. In the vicinity of the light switch 26, the refrigerator control console also includes a filtration system status indicator 66, described later in detail. The refrigerator control console 60 further incorporates a consumer label 67 surrounding the switch 26 and the indicator 66 on which is printed the following written matter describing the operation of the filter 44 and the meaning of the status indicator 66:

| "EZ-CHANGE SIGNAL | FILTER INDICATOR RESET |
|---|---|
| Green = Good Filter | Push the light switch |
| Yellow = Order Filter | 5 times in 10 seconds to reset |
| Red = Change Filter | filter indicator to green." |

Components of The Water Filter Status Monitoring and Indicating System

Figure 4:
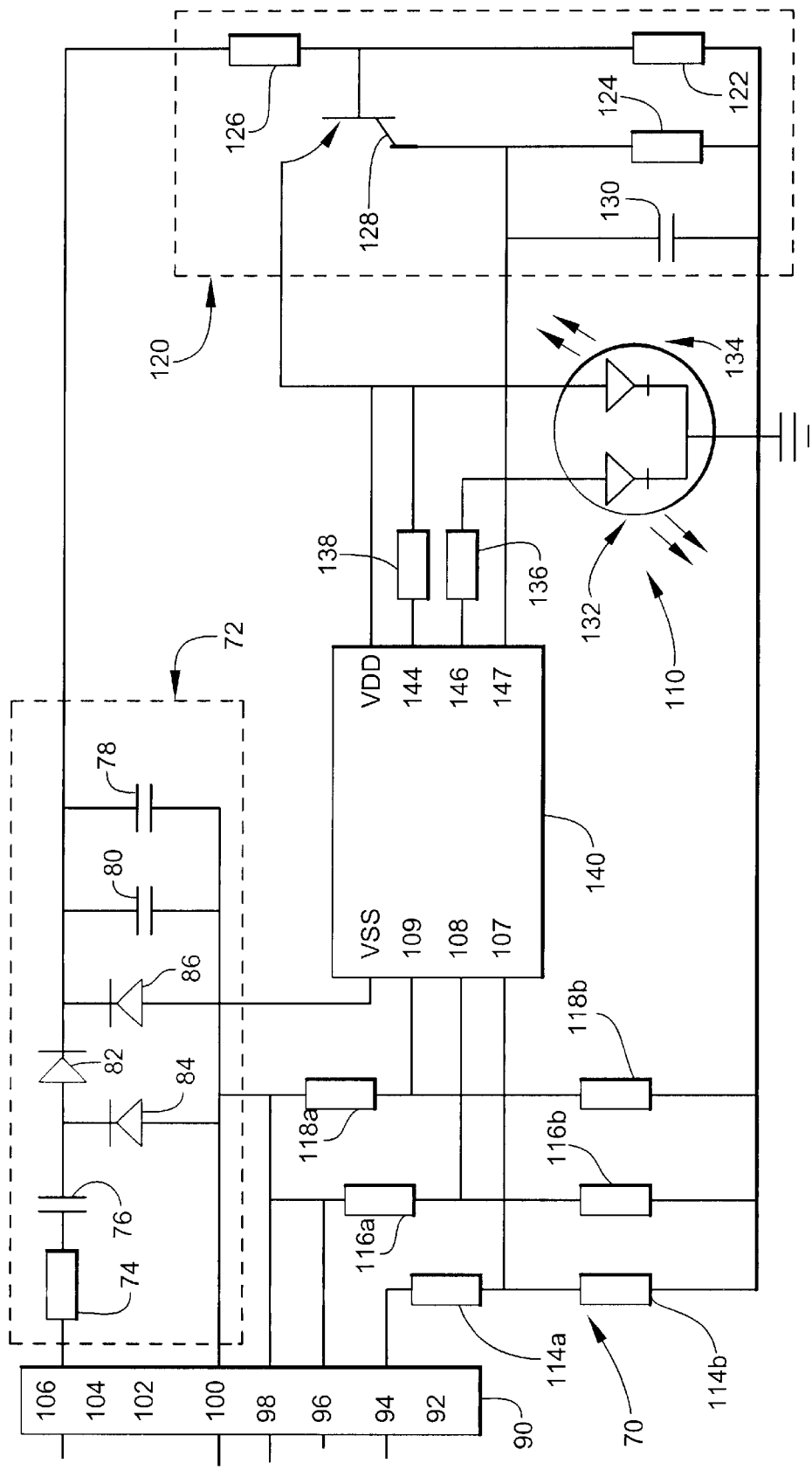
FIG. 4 is a schematic electrical diagram illustrating the electrical circuitry of the filter control and indicator system of FIG. 1.

Referring now to the FIG. 4, the Refrigerator 10 includes a water filter status monitoring and indicating system 70. The water filter status monitoring and indicating system 70 includes a power supply 72 comprising resistor 74, capacitors 76, 78 and 80 and diodes 82, 84, and 86 in a conventional capacitive drop design with capacitor 76 as the charge pump device, diode 82 as the rectifier. Diode 84 provides noise suppression and functions as a clamping diode. Diode 86 is a zener diode used as a simple voltage regulator. Capacitor 80 functions as the reservoir capacitor and capacitor 78 provides high frequency bypass. Resistor 74 is critical to line surge performance of the overall circuit since it absorbs most of the pulse energy.

The water filter status monitoring and indicating system 70 has an input connector 90 with three identical discrete digital inputs 94, 96 and 98. Input 94 monitors the operational status of light switch 26. Input 96 monitors the operational status of the electrical input of water valve 54 associated with the water dispenser of the ice and water dispensing system 46. Input 98 monitors the operational status of the electrical input of water valve 52 associated with the ice making apparatus 48. These inputs are designed for 120V (RMS) signals directly from the monitored loads. Each of these inputs 92, 94 and 96 has an identical input resistive divider network respectively comprised of pairs of resistors 114a, 114b, 116a, 116b, 118a and 118b. Each resistor pair, 114, 116 and 118, can also be viewed as a series device to limit current into the microprocessor input pins 107, 108 and 109, respectively, to the microprocessor device 140 described later, and a shunt device to provide input pull-down to a known state when the associated load is not activated.

The input connector 90 further has inputs 100 and 106 respectively connected to the neutral and the hot lines of the AC power supplied to the refrigerator 10. Inputs 92, 102 and 104 of the input connector 90 are not used.

The water filter status monitoring and indicating system 70 also has a power-on reset circuit 120 comprised of resistors 122, 124 and 126, transistor 128, and capacitor 130. Resistors 122 and 126 set the reset threshold voltage and provide base drive for the transistor 128, and, in turn provides a pull-up voltage to master clear input 147. Resistor 124 is a passive pull-down to the master clear input 147 of the microprocessor device 140 when VDD is low which establishes a valid logic low when VDD is below the threshold. Capacitor 130 provides filtering for high frequency noise and transients.

The water filter status monitoring and indicating system 70 further includes the filtration system status indicator 66, which in the preferred embodiment consists of a bi-color device 110 containing a red LED die 132 and a green LED die 134.

The microprocessor device 140 provides all logic functionality and memory. In addition to red and green, the color amber can be achieved by alternating resistors 136 and 138 by providing alternating signals from microprocessor output pins 144 and 146.

Microprocessor device 140 is preferably a Microchip PIC 12CE518 device, which contains 512 words of program ROM (implemented as OTP EPROM) and includes a 16 by 16 EEPROM.

The specifications of the preferred components of the water filter status monitoring and indicating system 70 are as indicated on Table 1 on FIG. 4b.

Programming Logic of The Water Filter Status Monitoring and Indicating System

FIG. 5 through FIG. 8 illustrate the programming and logic of the water filter status monitoring and indicating system 70 which is programmed into the microprocessor device 140. The Logic is intended to provide programming for alternative models, such as an A model refrigerator a B model refrigerator or a C model refrigerator, each having different functionality. The various models may have different replacement criteria for the filters depending on the gallon rating and the useful life of the filter.

Figure 5:
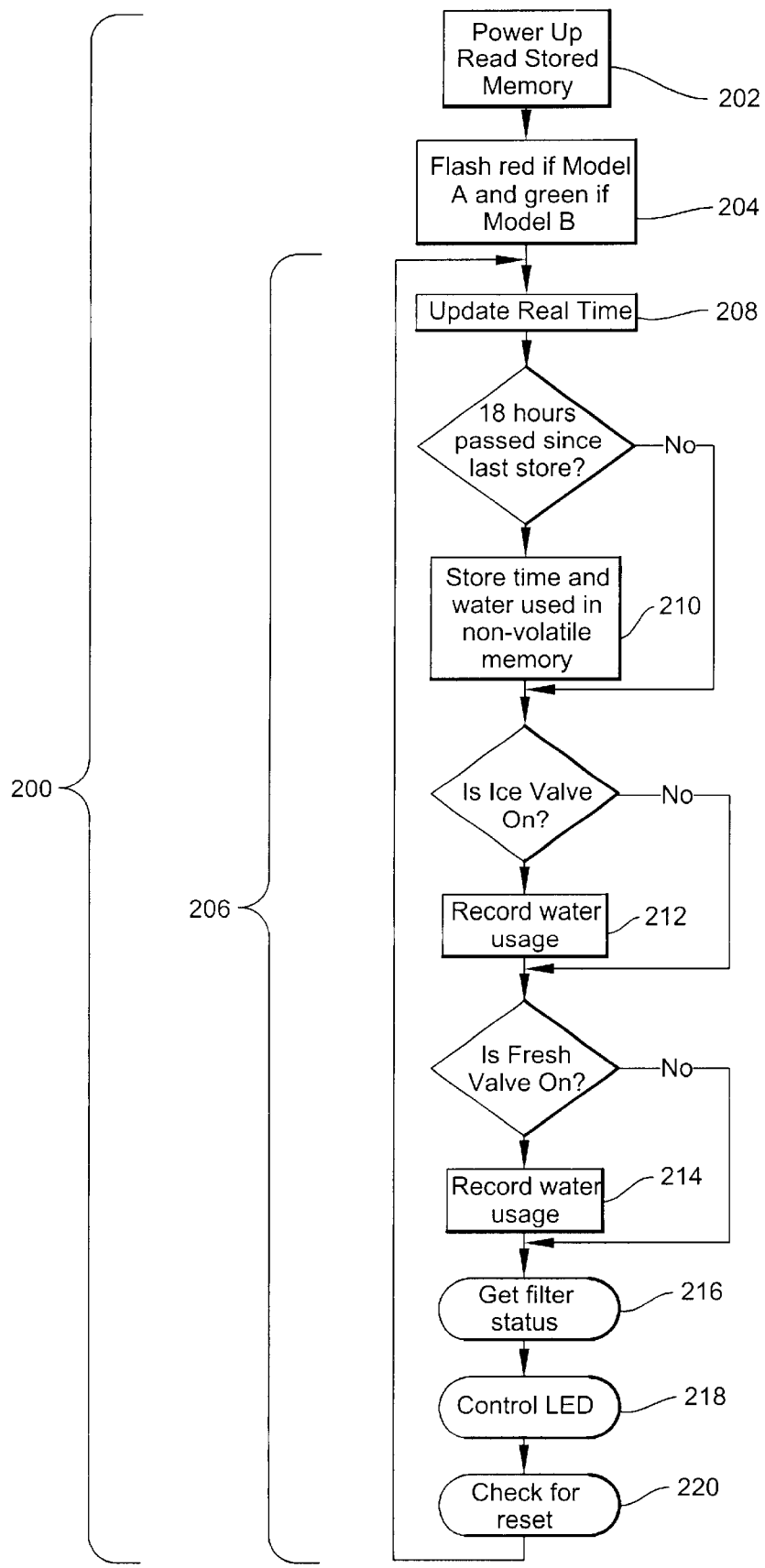
FIG. 5 is a flow chart illustrating the programming and logic of the filter control and indicator system of FIGS. 1 and 4 and more particularly illustrates the power-up and main subroutines of the filter control and indicator system.

Referring to FIG. 5, when the power is first supplied to the microprocessor device 140, a Power-up Subroutine 200 is initiated. At step 202, the microprocessor device reads the stored memory. At Step 204, the microprocessor device 140 sends a signal to the indicator 66 to flash red if the refrigerator is a Model A and green if it is a model B.

The microprocessor device 140 then enters a continuously repeated main subroutine 206. Within each repetition of main subroutine 206, microprocessor device 140 updates its clock at step 208 and, once every 18 hours, stores the time and water used in the non-volatile memory at step 210. At steps 212 and 214, respectively, the amount of water used is incremented if the ice valve 52 is open or if the fresh water valve 54 is open. The open time for each valve 52 and 54 is weighted for the normal water flow rate associated with the valve. At steps 216, 218 and 220, respectively, the microprocessor calls the filter status subroutine 250, the control subroutine 300 and the reset subroutine 350, after which the main subroutine 206 repeats.

Figure 6B:
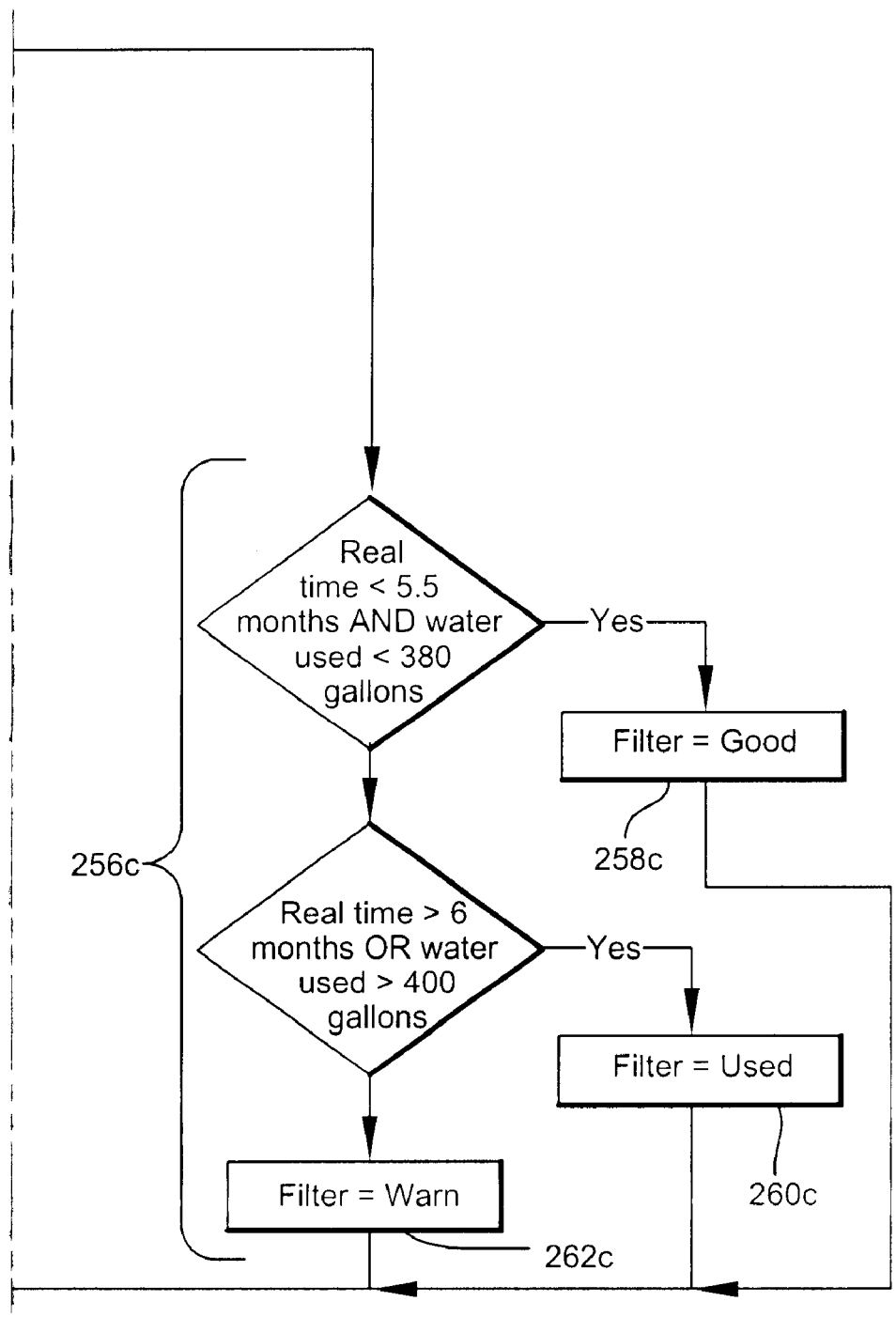
FIG. 6 is a flow chart illustrating the filter status subroutine of the main subroutine of FIG. 5, comprising FIG. 6A and FIG. 6B.

Referring to FIG. 6, the filter status subroutine 250 determines at steps 252 and 254 whether refrigerator 10 is a model A, B or C and directs the program to one of water usage comparison subroutines 256a, 256b and 256c, respectively for the appropriate model. In each respective water usage comparison subroutine 256a, 256b, and 256c, at respective steps 258a, 258b and 258c, the status of the filter is designated as "good" if less than a first predetermined time period has passed and less than a first predetermined quantity of water has been consumed, as indicated by the information stored in memory since the last reset. In each respective water usage comparison subroutine 256a, 256b, and 256c, at respective steps 260a, 260b and 260c, the status of the filter is designated as "used" if more than a second predetermined time period of usage or more than a second predetermined quantity of water has been consumed since the last reset. In each respective water usage comparison subroutine 256a, 256b, and 256c, at respective steps 262a, 262b and 262c, the status of the filter is designated as "warn" if the status has been set as neither "good" or "used".

Finally, at step 270, the time and water used is stored in non-volatile memory if the status of the filter has not been changed by the water usage comparison subroutine 256a, 256b or 256c. The status is not restored if it hasn't changed so as to maximize the useful life of the EEPROM non-volatile memory.

Figure 7:
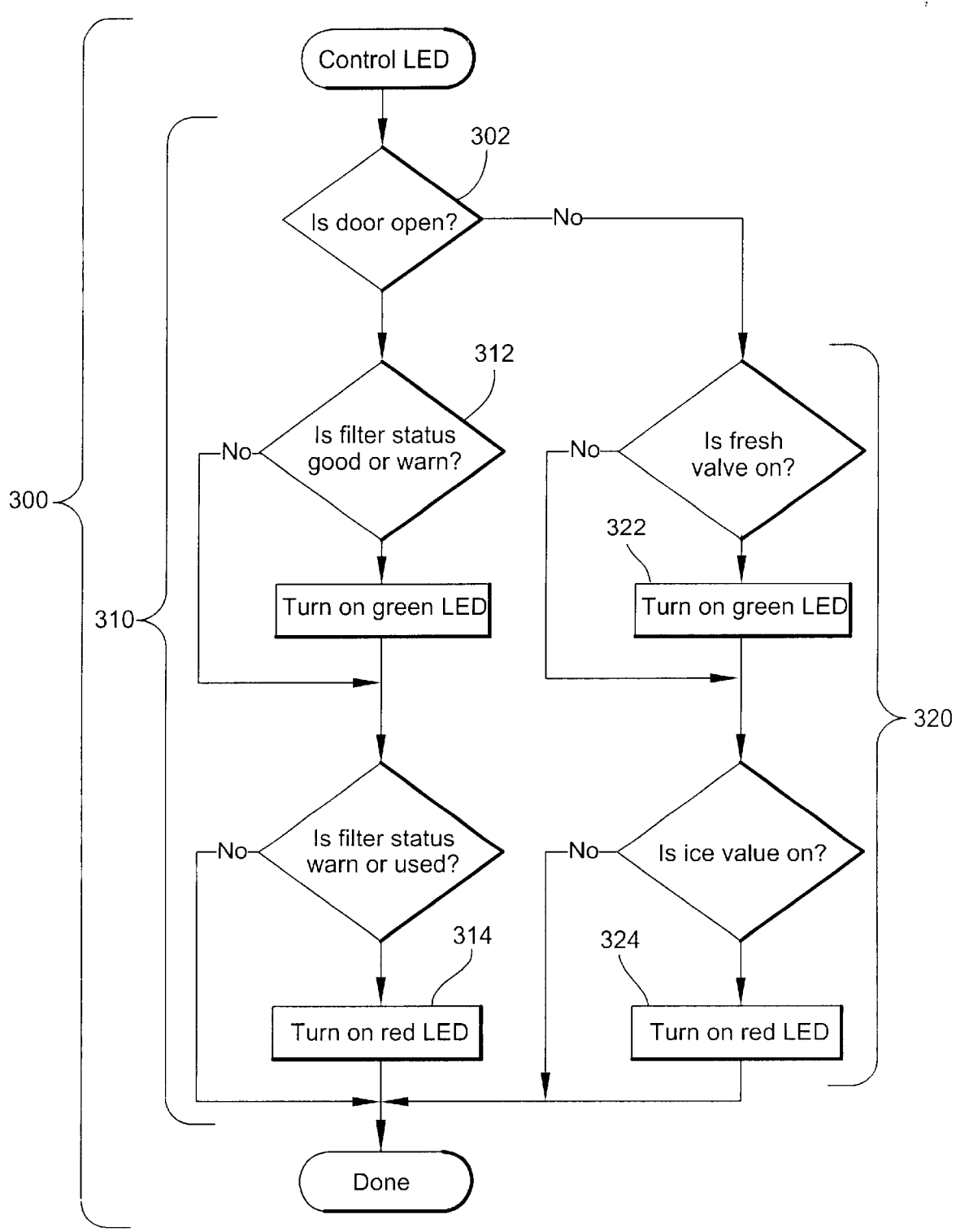
FIG. 7 is a flow chart illustrating the indicator subroutine of the main subroutine of FIG. 5, including the indicator subroutine and the diagnostics subroutine.

Referring to FIG. 7, the control subroutine 300 determines at step 302 if the fresh food door 20 is open by monitoring the voltage across the fresh food light switch 26.

If the fresh food door 20 is detected as open, then indicator subroutine 310 is run. At step 312, the green LED die 134 is illuminated if the status of the filter has been saved as "warn" or as "good". At step 314, the red LED die 132 is illuminated if the status of the filter has been saved as "warn" or as "used". Thus, if the status has been saved as "warn", both LED die are illuminated and the status indicator 66 appears amber in color.

The alternating signal of red and green is created by step 312 always turning off the green die, off if it is on, and, after a built-in time delay by having step 314 always turn off the red die, if it is on.

If the fresh food door 20 is detected as closed, then diagnostic subroutine 320 is run. At step 322, the green LED die is illuminated if the fresh water dispenser valve 54 is open. At step 324, the red LED die is illuminated if the water valve 52 to the ice making apparatus 48 is open. If both valves 52 and 54 are open, both LED die are illuminated and the status indicator 66 appears amber. The diagnostic subroutine 320 permits detection of malfunctions of the water valves 52 and 54 or the water filter status monitoring and indicating system 70 by a service technician manually be depressing the light switch 26 and selectively operating the valves 52 or 54, the service technician can isolate faults in the system.

Figure 8:
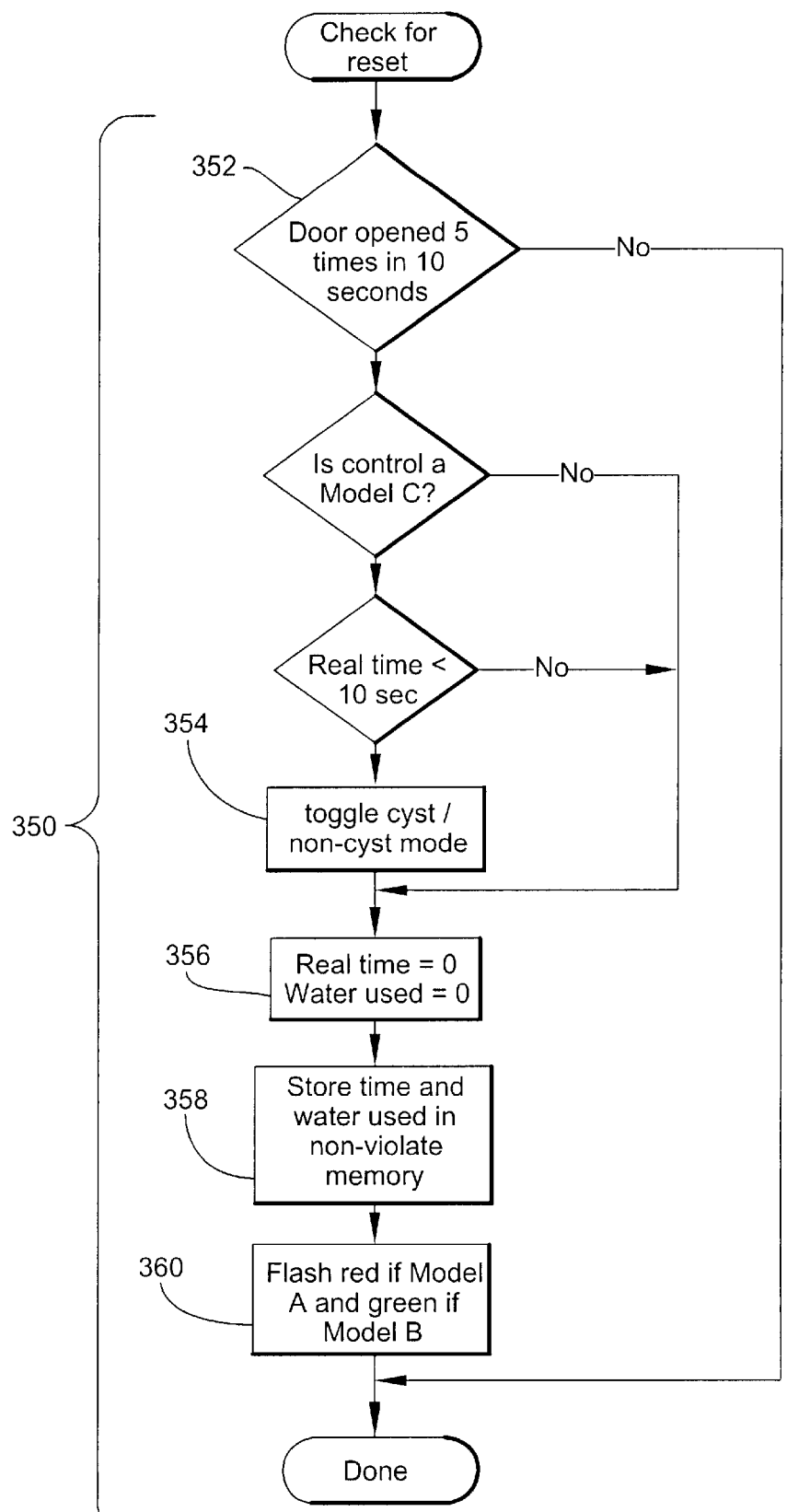
FIG. 8 is a flow chart illustrating the reset subroutine of the main subroutine of FIG. 5.

Referring to FIG. 8, the reset subroutine 350 determines at steps 352 if the light switch 26 has been depressed 5 times in less than ten seconds, indicating the user is sending a reset instruction to the microprocessor device 140. The user should do this when the filter is replaced. If a reset instruction has been detected at step 352, then the time and water usage counters are reset to zero at step 356 and stored at step 358. However, if the system has already been reset, within the last 10 seconds, that is, a reset instruction has been sent twice, then, at step 354, the microprocessor device reads the input as an instruction that a different type of filter is being used and changes the model setting from a model A to a model B. Finally, at step 360, the indicator is illuminated red or green to indicate the model setting.

The following details are offered to provide with even more particularly details of the best mode contemplated by the inventors at the time of filing for implementing the control described above.

| Inputs/Outputs | Active: | Inactive: |
| --- | --- | --- |
| Ice Valve Input | 60 Hz Input | Logic Level Low |
| Water Valve Input | 60 Hz Input | Logic Level Low |
| Light Switch Input | 60 Hz Input | Logic Level Low |
| Red LED | High Logic Level | |
| Green LED | High Logic Level | |

The filter counter (not illustrated) is a 16 bit counter in that is incremented as the ice and water valves are used. The counter is incremented once every time the valve on time reaches 2.5 seconds for the ice valve and 1.5 seconds for the water valve. These above values are determined by the flow rates of the valves actually used in the preferred embodiment and the resolution of the 8 bit timers that count the on time of the valves and may vary. Valve usage is recorded in 10 ms increments; therefor the maximum on time that can be recorded in 8 bits is 2.55 seconds.

Each increment of the filter counter represents the passage of 0.0125 gallons of water. A filter count value of 40,000 represents 500 gallons used and a filter count of 36,000 represents 450 gallons used. A filter count of 32,000 represents 400 gallons used and a filter count of 28,800 represents 360 gallons used. To minimize the code the software only checks the upper byte of this counter. Therefore the closest HEX values give trip points of 40,192 (0×9D00) and 36,096 (0×8D00) for normal mode and 32,000 (0×7D00) and 28,672 (0×7000) for cyst mode. The trip points in gallons are then 502.4 and 451.2 for normal mode and 400 and 358.4 for cyst mode.

The Real Time Counter is a 24-bit counter that is incremented every second. This counter is used to keep track of times up to 6 months in length. When 6 months is reached the counter is cleared and a flag is set to indicate that 6 months has passed. When a second 6 months has passed the timer is then frozen.

Time is kept using the internal RC oscillator. Using the preprogrammed oscillator calibration, 6 months can be timed to within +/−1 week.

In a Model A or B control the real time counter is incremented every 0.5 seconds. Therefore the timer resets when 3 months of actual time has passed. The six-month flag is then a 3-month flag.

Operation of the Water Filter Status Monitoring and Indicating System Components The purpose of the water filter indicator is to provide the consumer with a reliable measure of the filter cartridge end of life condition. There are two criteria for end of life, namely a prescribed number of gallons or a fixed period of real time. In order to monitor the water flow, the electrical inputs to both the ice maker valve and the dispenser valve are monitored by the WFI. Since the processor "knows" that the valves have flow rates of 0.3 and 0.5 gallons per minute, the flow can be computed from the amount of time which each is energized. It is in this fashion that the usage in gallons is accumulated.

Real time is simply accumulated by a divider from the processor clock. Since the clock used in this case is the internal RC oscillator, it is subject to more inaccuracy than would be experienced with a crystal controlled or 60 Hz based time keeping scheme. The Microchip literature guarantees this tolerance to be about 7.0% over voltage and temperature variations. Also included in the microprocessor is an EEPROM device, which provides non-volatile retention of flow as well as real time. In the preferred embodiment there is pre-programmed OSCCAL (oscillator calibration) value described in Sec. 8.2.5, pg. 32 of the PIC12CE5XX Data Sheet. This tightens up the tolerance so that we can guarantee 6 mo. +/−1 week (~4%).

The state of the water filter is indicated on a bi-color LED incorporating a red and a green die in the same package. By activating both die at a 50% duty cycle an amber color is obtained. Up to 90% life the indicator is green, from 90% to just less than 100% it is amber, and at end of life it shows red. User reset of the accumulated flow and time variables is effected by activating the door switch five times within 5 seconds.

In order to facilitate factory test as well as servicing in the field, the LED displays usage status only when the door is open. When the door is closed, the LED is off unless one or both of the valve inputs is active. The LED indicates red for the ice maker valve, green for the dispenser valve and amber if both valves are active.

The present invention therefore provide the consumer with a reliable measure of the filter cartridge end of life condition.

The present invention further provides an inexpensive filter monitoring and indicating system that informs the user that filter needs to be replaced, by illuminating red and further provides early warning that the filter will need to be replaced soon and therefore a new filter needs to purchased by illuminating yellow.

The present invention additionally provides a filter monitoring and indicating system that is flexible enough to permit its use with different types of filters yet doesn't add the cost of requiring an additional switch or sensor for detecting the type of filter being used by utilizing manual user input to the existing fresh food compartment door switch at a rate which would be unlikely to occur in normal door openings and closings.

The above constitutes a detailed description of the best mode of the present invention as contemplated by the inventors at the time of filing. It is further contemplated that changes and modifications may be made from the best mode described herein within without departing from the spirit of the present invention or the intended scope of the claims below.

What is claimed is:

1. In a water delivery system for delivering water to a water delivery station, said water delivery system having a replaceable filter and at least one water valve selectively operable to allow water passed through said replaceable filter to flow to said water delivery station, a water filter monitor and indicator assembly for indicating the status of said filter comprising:

a sensor detecting the operational status of said valve as being open or closed and providing an open\closed output indicative of the operational status of said valve;

a clock providing a time output indicative of the current time;

a door switch responsive to the opening and closing of a door and for providing a reset output;

a data processor comprising:
first, second and third data storage locations for data corresponding respectively to the amount of filter usage, the age of the filter, and the status of the filter;
a plurality of criteria, corresponding to pre-selected operational life standards for said replaceable filter; and
a plurality of inputs respectively adapted to receive said reset output, said open\closed output and said time output;

said data processor further comprising programming adapted to:
process said reset output to reset data in said first and second data storage locations to zero;
process said open\closed output to calculate and store in said first data storage location the amount of time that said open\closed output has indicated that said valve is open since the last time data in said first data storage location has been reset to zero;
process said time output to calculate and store in said second data storage location the amount of time that has passed since data in said second data storage location has been reset to zero;
compare data in said first and second data storage locations with said plurality of criteria and store in said third data storage location data indicative of one of a first, second or third filter status corresponding, respectively to a good filter, a filter which is near a condition of needing replacement, and a filter which needs to be replaced based on said criteria;
generate a filter status output indicative of one of said first,
second or third filter statuses; and
an indicator adapted to receive said filter status output and to provide an indication of the filter status to the user.

2. In the water delivery system of claim 1, the improvement wherein said data processor comprises a microprocessor and a memory device, said memory device providing for continuing storage of data in said first, second and third data storage locations in the event of a power outage.

3. In the water delivery system of claim 1, the improvement wherein said plurality of criteria comprises:
a first pre-selected number representing a maximum operational time period for usage of said replaceable filter;
a second pre-selected number less than said first pre-selected number representing an operational time period after which a user should consider obtaining a replacement for said replaceable filter;
a third pre-selected number representing a maximum total time period for installation of said replaceable filter;
a fourth pre-selected number less than said third pre-selected number representing an installed time period after which a user should consider obtaining a replacement for said replaceable filter;
and further wherein said data processor stores in said third data storage location:
an indication that said filter needs to be replaced if said first data storage location has a number exceeding said first pre-selected number or said second data storage location has number exceeding said second pre-selected number;
an indication that said filter is good if said first data storage location has a number below said third pre-selected number and said second data storage location has number below said fourth pre-selected number; and
an indication that said filter will soon be in need of replacement otherwise.

4. In the water delivery system of claim 1, the improvement wherein said indicator provides a visual indication of filter status.

5. In the water delivery system of claim 4, the improvement wherein said indicator comprises:
a tri-color light emitting diode adapted to emit a first, second and third color; and a control circuit comprising:
an input adapted to receive said filter status output; and
an output for illuminating said light emitting diode in first second and third colors in response, respectively, to said filter status output indicating, respectively, said first, second and third filter status.

6. In the water delivery system of claim 5, the improvement wherein said first, second and third colors comprise green, yellow and red respectively.

7. In the water delivery system of claim 1, the improvement wherein:
said plurality of criteria comprises at least a first and a second set of criteria corresponding respectively to pre-selected operational life standards for a first and a second type of said replaceable filter; and
said data processor further comprises a fourth data storage location for storing data indicative of the whether said filter is of said first or second type; and
said programming is adapted to read the type of filter and select the appropriate criteria for said replaceable filter.

8. In the water delivery system of claim 7, the improvement wherein each of first and second set of criteria comprises:
a first pre-selected number representing a maximum operational time period for usage of said replaceable filter;
a second pre-selected number less than said first pre-selected number representing an operational time period after which a user should consider obtaining a replacement for said replaceable filter;
a third pre-selected number representing a maximum total time period for installation of said replaceable filter;
a fourth pre-selected number less than said third pre-selected number representing an installed time period after which a user should consider obtaining a replacement for said replaceable filter;
and further wherein said data processor reads the type of filter in said fourth data storage location to select the corresponding first, second, third and fourth pre-selected numbers and then stores in said third data storage location:
an indication that said filter needs to be replaced if said first data storage location has a number exceeding said first pre-selected number or said second data storage location has number exceeding said second pre-selected number;
an indication that said filter is good if said first data storage location has a number below said third pre-selected number and said second data storage location has number below said fourth pre-selected number; and
an indication that said filter will soon be in need of replacement otherwise.

9. In the water delivery system of claim 1 wherein there are at least two of said valves, the improvement wherein:
said water filter monitor and indicator assembly further comprises at least two of said sensors each respectively detecting the operational status of one of said valves as being open or closed and providing an open\closed output indicative of the operational status of said valve; and
said programming is adapted to store in said first data storage location the total open time of all of said valves.

10. A water filter monitor and indicator assembly for use in a refrigerator having a cabinet with a fresh food compartment, a fresh food door hingedly mounted to said cabinet to open and close said fresh food compartment, a fresh food door switch selectively activated by the closing of said fresh food door, an ice maker and an ice and water delivery assembly mounted to said cabinet, first and second water supply lines for delivering water to said ice maker and to said ice and water delivery system, first and second valves respectively disposed along said first and second water supply lines and operable to allow water to pass through said supply lines, a main supply line delivering water to both said first and second supply lines and a replaceable filter disposed along said main supply line; said water filter monitor and indicator assembly comprising:
a first and a second sensor detecting the operational status of said first and said second valves, respectively, as being open or closed and providing a first and second open\closed output, respectively indicative of the operational status of said valve;
a third sensor detecting the status of said door switch as being depressed by said fresh food door or being relaxed and providing a door status output indicative of the open or closed status of said fresh food door;
a clock providing a time output indicative of the current time;
a data processor comprising:
first, second and third data storage locations for data corresponding respectively to the amount of filter usage, the age of the filter, and the status of the filter;
a plurality of criteria, corresponding to pre-selected operational life standards for said replaceable filter; and
a plurality of inputs respectively adapted to receive said door status output, said first and second open\closed output and said time output;
said data processor further comprising programming adapted to:
process said door status output to reset said first and second data storage locations to zero when said programming detects a pre-selected sequence of open and close inputs have been received from said door switch sensor indicative of a intentional manual input of a reset command;
process said first and second open\closed outputs to calculate and store in said first data storage location the total amount of time that either of said open\closed outputs has indicated that a valve is open since the last time data in said first data storage location has been reset to zero;
process said time output to calculate and store in said second data storage location the amount of time that has passed since data in said second data storage location has been reset to zero;
compare data in said first and second data storage locations with said plurality of criteria and store in said third data storage location data indicative of one of a first, second or third filter status corresponding, respectively, to a good filter, a filter which is near a condition of needing replacement, and a filter which needs to be replaced based on said criteria;
generate a filter status output indicative of one of said first, second or third filter statuses; and
an indicator adapted to receive said filter status output and to provide an indication of the filter status to the user.

11. The water filter monitor and indicator assembly of claim 10 wherein said pre-selected sequence of open and close inputs for indicating an intentional input of a reset command consists of a predetermined quantity of open and closed outputs within a predetermined time period, such time period being selected to be sufficiently short as to reduce significantly the possibility that such signal would be inadvertently generated during normal operation of the fresh food door.

12. The water filter monitor and indicator assembly of claim 10 wherein said plurality of criteria corresponding to pre-selected operational life standards for said replaceable filter comprise pre-selected capacity and age criteria for replacement of said replaceable filter and a pre-selected percentage of said capacity and age criteria for warning the user to replace said replaceable filter.

13. The water filter monitor and indicator assembly of claim 12 wherein said pre-selected percentage is 90%.

14. The water filter monitor and indicator assembly of claim 10 wherein said plurality of criteria comprises:
   a first pre-selected number representing a maximum operational time period for usage of said replaceable filter;
   a second pre-selected number less than said first pre-selected number representing an operational time period after which a user should consider obtaining a replacement for said replaceable filter;
   a third pre-selected number representing a maximum total time period for installation of said replaceable filter;
   a fourth pre-selected number less than said third pre-selected number representing an installed time period after which a user should consider obtaining a replacement for said replaceable filter;
and further wherein said data processor stores in said third data storage location:
   an indication that said filter needs to be replaced if said first data storage location has a number exceeding said first pre-selected number or said second data storage location has number exceeding said second pre-selected number;
   an indication that said filter is good if said first data storage location has a number below said third pre-selected number and said second data storage location has number below said fourth pre-selected number; and
   an indication that said filter will soon be in need of replacement otherwise.

15. The water filter monitor and indicator assembly of claim 10 wherein said indicator comprises:
   a tri-color light emitting diode adapted to emit a first, second and third color; and
   a control circuit comprising:
      an input adapted to receive said filter status output; and
      an output for illuminating said light emitting diode in first, second and third colors in response, respectively, to said filter status output indicating, respectively, said first, second and third filter status.

16. The water filter monitor and indicator assembly of claim 10 wherein:
   said plurality of criteria comprises at least a first and a second set of criteria corresponding respectively to pre-selected operational life standards for a first and a second type of said replaceable filter; and
   said data processor further comprises a fourth data storage location for storing data indicative of whether said filter is of said first or second type; and
   said programming is adapted to read the type of filter and select the appropriate criteria for said replaceable filter.

17. The water filter monitor and indicator assembly of claim 16 wherein each of first and second set of criteria comprises:
   a first pre-selected number representing a maximum operational time period for usage of said replaceable filter;
   a second pre-selected number less than said first pre-selected number representing an operational time period after which a user should consider obtaining a replacement for said replaceable filter;
   a third pre-selected number representing a maximum total time period for installation of said replaceable filter;
   a fourth pre-selected number less than said third pre-selected number representing an installed time period after which a user should consider obtaining a replacement for said replaceable filter;
and further wherein said data processor reads the type of filter in said fourth data storage location to select the corresponding first second third and fourth pre-selected numbers and then stores in said third data storage location:
   an indication that said filter needs to be replaced if said first data storage location has a number exceeding said first pre-selected number or said second data storage location has number exceeding said second pre-selected number;
   an indication that said filter is good if said first data storage location has a number below said third pre-selected number and said second data storage location has number below said fourth pre-selected number; and
   an indication that said filter will soon be in need of replacement otherwise.

* * * * *